(12) United States Patent
Raithel

(10) Patent No.: US 8,661,890 B1
(45) Date of Patent: Mar. 4, 2014

(54) RAIN MONITORING SYSTEM

(76) Inventor: Mark Raithel, Morton, IL (US)

( * ) Notice: Subject to any disclaimer, the term of this patent is extended or adjusted under 35 U.S.C. 154(b) by 214 days.

(21) Appl. No.: 13/360,887

(22) Filed: Jan. 30, 2012

(51) Int. Cl.
*G01W 1/00* (2006.01)

(52) U.S. Cl.
USPC ..................... 73/170.17; 73/170.16

(58) Field of Classification Search
None
See application file for complete search history.

(56) References Cited

U.S. PATENT DOCUMENTS

| | | | |
|---|---|---|---|
| 3,575,641 A * | 4/1971 | Long et al. | 361/178 |
| 3,825,804 A | 7/1974 | Amelunxen | |
| 3,826,135 A | 7/1974 | Hollmann | |
| 4,292,843 A | 10/1981 | Luchessa et al. | |
| 5,394,748 A | 3/1995 | McCarthy | |
| 5,898,110 A | 4/1999 | Hagstrom | |
| 6,038,920 A | 3/2000 | Gilbert et al. | |
| 6,609,422 B1 | 8/2003 | Geschwender | |
| 6,711,521 B1 * | 3/2004 | Hallett et al. | 702/130 |
| 6,714,869 B1 * | 3/2004 | Hallett et al. | 702/3 |
| 7,716,981 B2 * | 5/2010 | Schmitt et al. | 73/170.17 |
| 8,505,377 B2 * | 8/2013 | Rasmussen et al. | 73/170.19 |

* cited by examiner

*Primary Examiner* — Andre Allen

(57) ABSTRACT

A rain monitoring system includes a rain monitor configured to measure fluid precipitation. A mount is provided and the rain monitor is attached to the mount. The mount includes a lower plate that has a top side, a bottom side and a perimeter edge. The lower plate has a plurality of primary apertures extending therethrough. An upper plate has an upper side, a lower side and an exterior edge. The upper plate has a plurality of secondary apertures extending therethrough. The rain monitor may be positioned on the upper side. A plurality of fasteners each has a first end and a second end. Each of the fasteners extends through a corresponding one of the primary apertures. Each of the fasteners threadably engages one of the secondary apertures to retain the upper plate above the lower plate. A support is attached to the mount and supports the mount above a surface.

5 Claims, 4 Drawing Sheets

RAIN MONITORING SYSTEM

BACKGROUND OF THE DISCLOSURE

Field of the Disclosure

The disclosure relates to rain monitoring devices and more particularly pertains to a new rain monitoring device for monitoring amounts of fluid precipitation.

SUMMARY OF THE DISCLOSURE

An embodiment of the disclosure meets the needs presented above by generally comprising a rain monitor configured to measure fluid precipitation. A mount is provided and the rain monitor is attached to the mount. The mount includes a lower plate that has a top side, a bottom side and a perimeter edge. The lower plate has a plurality of primary apertures extending therethrough and each of the primary apertures extends through each of the top and bottom sides. An upper plate has an upper side, a lower side and an exterior edge. The upper plate has a plurality of secondary apertures extending therethrough and the secondary apertures extend through each of the upper and lower sides. The rain monitor may be positioned on the upper side. A plurality of fasteners each has a first end and a second end. Each of the fasteners is threaded and the second end comprises a head. Each of the fasteners extends through a corresponding one of the primary apertures and has the head abut the bottom side. Each of the fasteners threadably engages one of the secondary apertures to retain the upper plate at a selectively adjustable vertical distance from the lower plate. A support is attached to the mount and supports the mount above a support surface. Each of the fasteners may be rotated in a first direction to decrease the vertical distance between the upper and lower plates or in a second direction to increase the vertical distance between the upper and lower plates such that the upper plate is brought into level.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
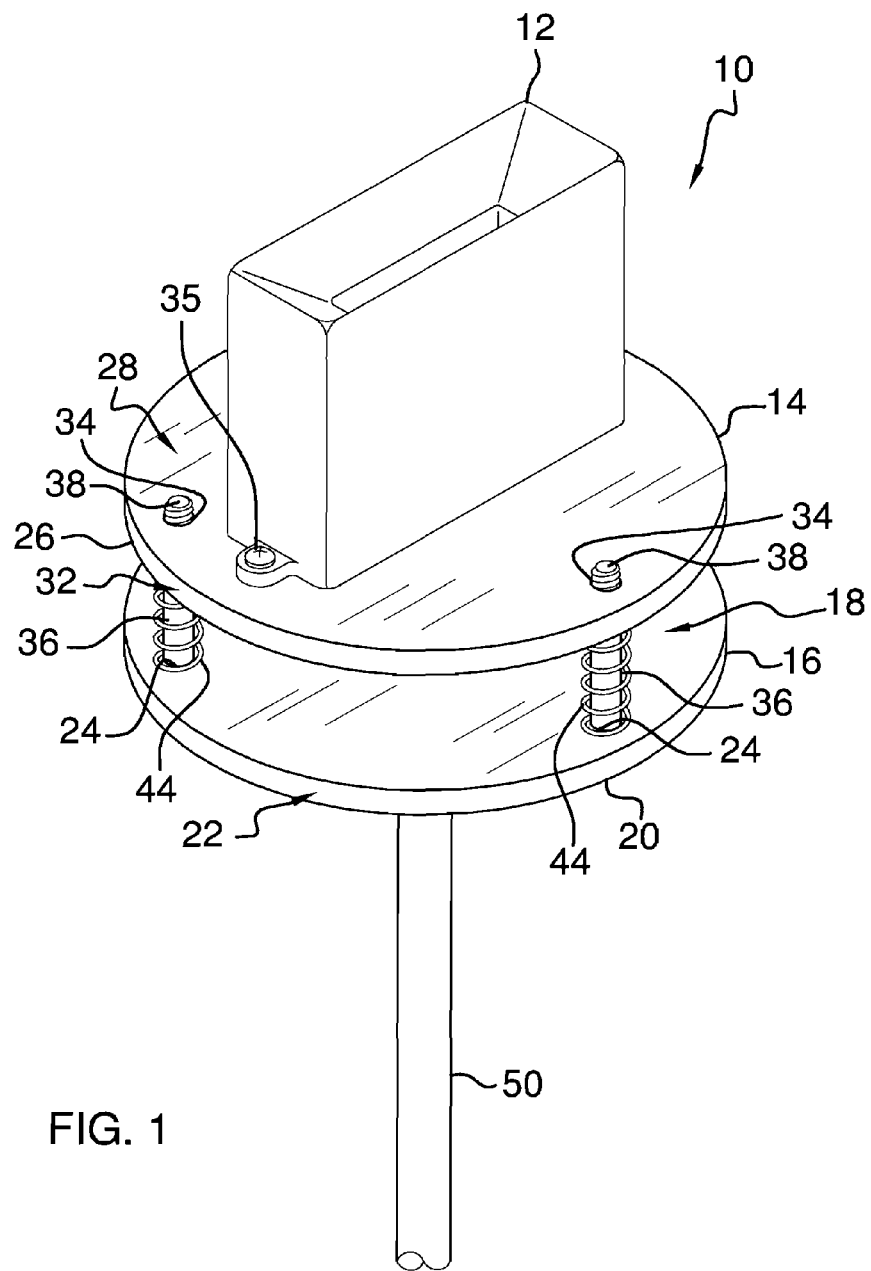
FIG. 1 is a to perspective view of a rain monitoring system according to an embodiment of the disclosure.
Figure 2:
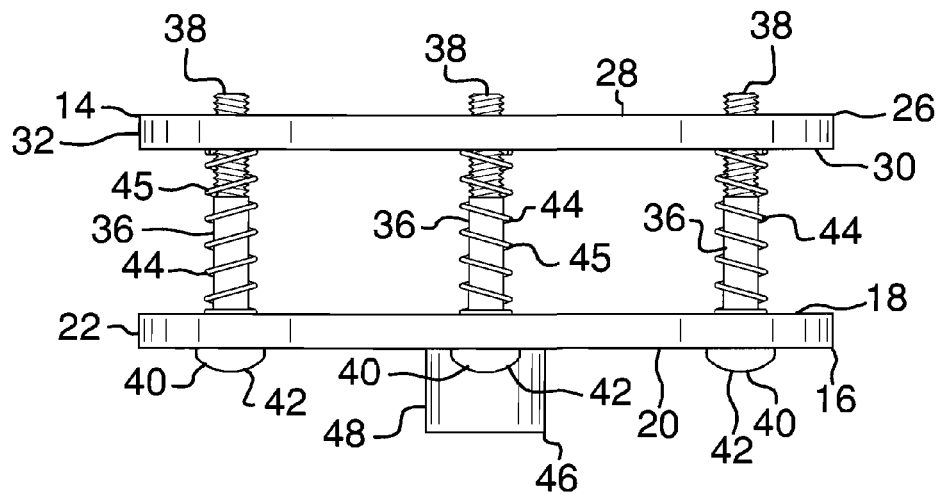
FIG. 2 is a front side view of an embodiment of the disclosure.
Figure 3:
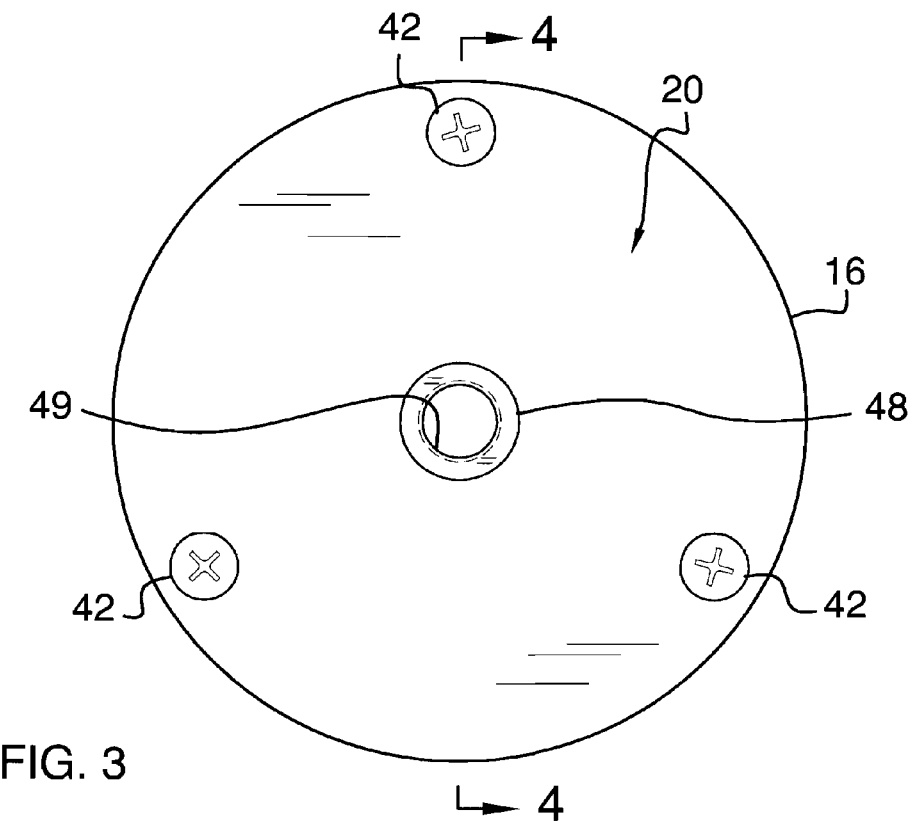
FIG. 3 is a bottom side view of an embodiment of the disclosure.
Figure 4:
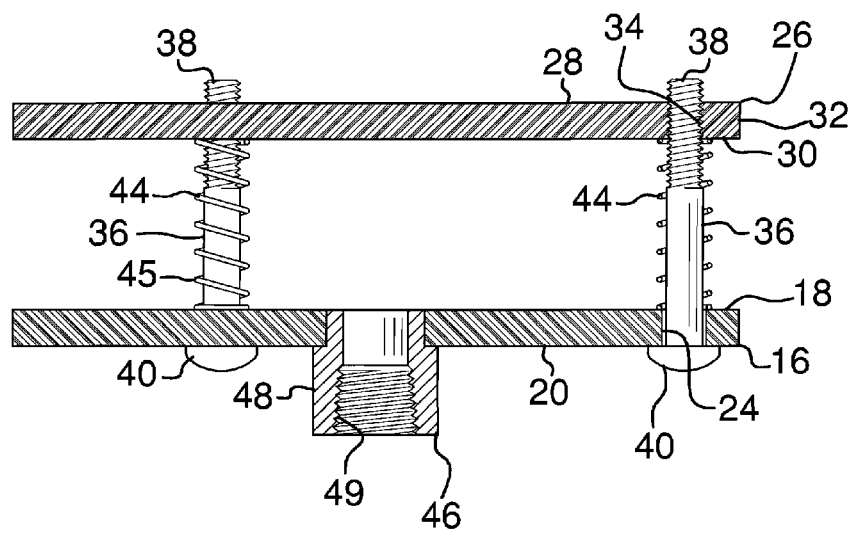
FIG. 4 is a cross sectional view taken along line 4-4 of FIG. 3 of an embodiment of the disclosure.
Figure 5:
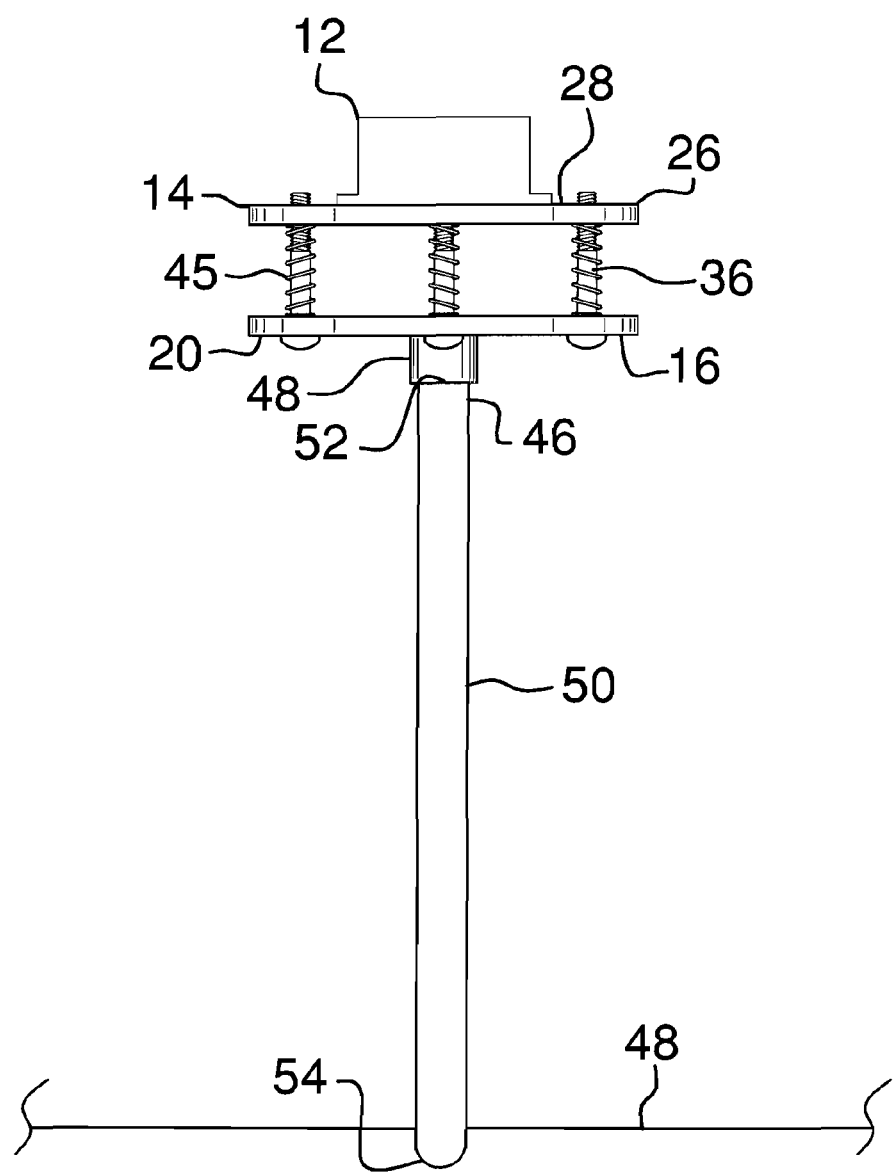
FIG. 5 is an in-use view of an embodiment of the disclosure.

With reference now to the drawings, and in particular to FIGS. 1 through 5 thereof, a new rain monitoring device embodying the principles and concepts of an embodiment of the disclosure and generally designated by the reference numeral 10 will be described.

As best illustrated in FIGS. 1 through 5, the rain monitoring system 10 generally comprises a rain monitor 12 configured to measure fluid precipitation. The rain monitor 12 may be of any conventional design and in particular may include a wireless connection to a receiving unit. A mount 14 is provided and the rain monitor 12 is attached to the mount 14. The mount 14 includes a lower plate 16 that has a top side 18, a bottom side 20 and a perimeter edge 22. The lower plate 16 has a plurality of primary apertures 24 extending therethrough and each of the primary apertures 24 extends through each of the top 18 and bottom 20 sides. The lower plate 16 may be comprised of a rigid material.

An upper plate 26 has an upper side 28, a lower side 30 and an exterior edge 32. The upper plate 26 has a plurality of secondary apertures 34 extending therethrough and each of the secondary apertures 34 extends through each of the upper 28 and lower 30 sides. The upper plate 26 may be comprised of a rigid material. The rain monitor 12 may be positioned on the upper side 28 and the rain monitor 12 may be retained on the upper side 28 with a mechanical coupler 35.

A plurality of fasteners 36 each has a first end 38 and a second end 40. Each of the fasteners 36 is threaded and the second end 40 comprises a head 42. The head 42 may be a bolt of any conventional design or the head 42 may be a screw head of any conventional design. Each of the fasteners 36 extends through a corresponding one of the primary apertures 24 and has the head 42 abut the bottom side 20. Each of the fasteners 36 threadably engages one of the secondary apertures 34 to retain the upper plate 26 at a selectively adjustable vertical distance from the lower plate 16.

Each of the fasteners 36 may be rotated in a first direction to decrease a vertical distance between the upper 26 and lower 16 plates. Each of the fasteners 36 may be rotated in a second direction to increase the vertical distance between the upper 26 and lower 16 plates. Each of the fasteners 36 may be rotated in either the first or second direction to bring the upper plate 26 into level.

A plurality of biasing members 44 is each positioned between the lower 16 and upper 26 plates. Each of the biasing members 44 biases the upper plate 26 upwardly away from the lower plate 16. Each of the biasing members 44 is mounted on and extends around one of the fasteners 36. Each of the biasing members 44 may comprise a spring 46. The biasing members 44 may minimize unintentional movement of the upper plate on fasteners 36.

A support 46 is attached to the mount 14 and supports the mount 14 above a support surface 48. The support 46 includes a receiver 48 that is attached to the mount 14. The receiver 48 is positioned on and extends downwardly from the bottom side 20. An inner surface 50 of the receiver 48 may be threaded. The receiver 48 may comprise a rigid material.

A pole 50 has an upper end 52 that may be threaded and the upper end 52 may be positioned in the receiver 48 to elevate the mount 14 a distance above the support surface 48. A bottom end 54 of the pole 50 engages the support surface 48. The support surface 48 may comprise earth or a structure, and the bottom end 54 of the pole 50 may be sunk into the earth 56. The pole 50 may be comprised of a rigid material.

In use, the bottom end 54 of the pole 50 may engage the support surface 48. The mount 14 may be positioned on the upper end 52 of the pole 50. The rain monitor 12 may be positioned on the upper side 28. Each of the fasteners 36 may be rotated in either the first or second direction to bring the upper plate 26 into level.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A rain monitoring system comprising:
   a rain monitor configured to measure fluid precipitation;
   a mount, said rain monitor being attached to said mount, said mount including;
      a lower plate having a top side, a bottom side and a perimeter edge, said lower plate having a plurality of primary apertures extending therethrough, each of said primary apertures extending through each of said top and bottom sides;
      an upper plate having an upper side, a lower side and an exterior edge, said upper plate having a plurality of secondary apertures extending therethrough, said secondary apertures extending through each of said upper and lower sides, said rain monitor being positioned on said upper side;
      a plurality of fasteners each having a first end and a second end, each of said fasteners being threaded, said second end comprising a head, each of said fasteners extending through a corresponding one of said primary apertures and having said head abut said bottom side, each of said fasteners threadably engaging one of said secondary apertures to retain said upper plate at a selectively adjustable vertical distance from said lower plate;
   a support being attached to said mount and supporting said mount above a support surface; and
   wherein each of said fasteners are rotated in a first direction to decrease the vertical distance between said upper and lower plates or in a second direction to increase the vertical distance between said upper and lower plates such that said upper plate is brought into level.

2. The system according to claim 1, further including a plurality of biasing members, each of said biasing members being positioned between said lower and upper plates, each of said biasing members biasing said upper plate upwardly away from said lower plate.

3. The system according to claim 1, wherein each of said biasing members is mounted on and extends around one of said fasteners, each of said biasing members comprising a spring.

4. The system according to claim 1, wherein said support includes:
   a receiver being attached to said mount, said receiving being positioned on and extending downwardly from said bottom side; and
   a pole having an end being positioned in said receiver to elevate said mount a distance above the support surface, a bottom end of said pole engaging the support surface.

5. A rain monitoring system comprising:
   a rain monitor configured to measure fluid precipitation;
   a mount, said rain monitor being attached to said mount, said mount including;
      a lower plate having a top side, a bottom side and a perimeter edge, said lower plate having a plurality of primary apertures extending therethrough, each of said primary apertures extending through each of said top and bottom sides, said lower plate being comprised of a rigid material;
      an upper plate having an upper side, a lower side and an exterior edge, said upper plate having a plurality of secondary apertures extending therethrough, said secondary apertures extending through each of said upper and lower sides, said upper plate being comprised of a rigid material, said rain monitor being positioned on said upper side;
      a plurality of fasteners each having a first end and a second end, each of said fasteners being threaded, said second end comprising a head, each of said fasteners extending through a corresponding one of said primary apertures and having said head abut said bottom side, each of said fasteners threadably engaging one of said secondary apertures to retain said upper plate at a selectively adjustable vertical distance from said lower plate;
      a plurality of biasing members, each of said biasing members being positioned between said lower and upper plates, each of said biasing members biasing said upper plate upwardly away from said lower plate, each of said biasing members being mounted on and extending around one of said fasteners, each of said biasing members comprising a spring;
   a support being attached to said mount and supporting said mount above a support surface, said support including;
      a receiver being attached to said mount, said receiving being positioned on and extending downwardly from said bottom side;
      a pole having an end being positioned in said receiver to elevate said mount a distance above the support surface, a bottom end of said pole engaging the support surface; and
   wherein each of said fasteners are rotated in a first direction to decrease the vertical distance between said upper and lower plates or in a second direction to increase the vertical distance between said upper and lower plates such that said upper plate is brought into level.

\* \* \* \* \*